United States Patent [19]

Waller

[11] Patent Number: 4,548,624

[45] Date of Patent: Oct. 22, 1985

[54] HYGROSCOPIC BREATHER CAP

[75] Inventor: James E. Waller, Madison, Tenn.

[73] Assignee: Des Case Corporation, Madison, Tenn.

[21] Appl. No.: 623,234

[22] Filed: Jun. 21, 1984

Related U.S. Application Data

[63] Continuation of Ser. No. 514,459, Jul. 15, 1983, Pat. No. 4,504,289.

[51] Int. Cl.$^4$ .............................................. B01D 53/04
[52] U.S. Cl. ........................................ 55/274; 55/316; 55/387
[58] Field of Search ................... 55/274, 275, 316, 387, 55/503, 518, 519; 210/282, 288, 438, 439

[56] References Cited

U.S. PATENT DOCUMENTS

| | | | |
|---|---|---|---|
| 629,739 | 7/1899 | Baulieu | 210/439 X |
| 2,087,887 | 7/1937 | Gesner | 210/288 X |
| 2,675,093 | 4/1954 | McCall et al. | 55/387 X |
| 2,758,719 | 8/1956 | Line | 55/387 X |
| 2,845,138 | 7/1958 | Gageby | 55/387 |
| 3,254,771 | 6/1966 | Sicard | 210/439 X |
| 3,266,628 | 8/1966 | Price | 210/439 X |
| 3,353,339 | 11/1967 | Walter | 55/316 |
| 3,392,838 | 7/1968 | Petrucci | 210/288 |
| 3,618,771 | 11/1971 | Akers et al. | 210/288 X |
| 3,705,480 | 12/1972 | Wireman | 55/316 X |
| 3,731,678 | 5/1973 | Pyzel | 55/387 X |
| 3,744,976 | 7/1973 | Tongue | 55/71 X |
| 4,064,876 | 12/1977 | Mulchi | 55/316 X |
| 4,388,086 | 6/1983 | Bauer et al. | 55/316 X |

FOREIGN PATENT DOCUMENTS

| | | | |
|---|---|---|---|
| 1247430 | 10/1960 | France | 55/316 |
| 1200985 | 8/1970 | United Kingdom | 55/316 |

Primary Examiner—Robert Spitzer
Attorney, Agent, or Firm—L. Lawton Rogers, III

[57] ABSTRACT

The hygroscopic breather cap for a fluid such as a liquid petroleum tank in which air enters the bottom of an elongated cylinder, passes through a knitted fabric filter to remove dust particles, passes through a desiccant along the entire height of the cylinder to remove moisture, passes through a second knitted fabric filter to remove desiccant fines, and then passes into the opening of a standpipe for passage downwardly along the axis of the cylinder into the petroleum tank. A window may be provided in the top of the cylinder to view the condition of the desiccant, or alternatively, the body of the cylinder may be made transparent. A number of reduced strength areas may be provided at the bottom of the cylinder so that the effective size of the opening to the atmosphere may be selectively varied. A removable cap permits a recharging of the cylinder with desiccant.

10 Claims, 5 Drawing Figures

U.S. Patent   Oct. 22, 1985   Sheet 1 of 2   4,548,624

HYGROSCOPIC BREATHER CAP

This is a continuation of application Ser. No. 514,459, filed July 15, 1983, now U.S. Pat. No. 4,504,289.

BACKGROUND OF THE INVENTION

The present invention relates to a breather cap for a liquid petroleum tank and is intended to insure that the air passing into the petroleum tank is both clean and dry.

The problems associated with the contamination of petroleum fluids are well known. As the enclosed oil in an industrial machine cools when the operation of the machine ceases, a partial vacuum is typically created in the oil reservoir. This partial vacuum draws air into the oil reservoir. Unfortunately, the air drawn into the reservoir is often contaminated with dust and with moisture. As a result, the oil within the tank is contaminated and must be periodically changed to avoid damage to the machine it lubricates.

Not only is the oil directly contaminated by the dust and moisture in the air, the presence of moisture within the oil reservoir often causes oxidation of the oil reservoir itself and the oxidation products serve as a further contaminant to the oil.

The filtering of the air entering an oil reservoir to remove dust particles is well known and is shown for example in the Risse et al U.S. Pat. No. 3,160,487 dated Dec. 8, 1964, the Fisher U.S. Pat. No. 3,244,314 dated Apr. 5, 1966 and the Claar U.S. Pat. No. 3,546,853 dated Dec. 15, 1979. In filters of this type, air is generally permitted to pass upwardly through apertures in the bottom of the filter, through a filter material, and then downwardly into the oil reservoir. However, such systems do not provide for the removal of moisture from the air.

Attempts have been made to dry the air entering an oil reservoir. In systems such as illustrated in the McCall U.S. Pat. No. 2,603,308 dated July 15, 1952, air is permitted to pass upwardly through a filter element into a cavity containing a desiccant. Such systems generally do not provide for the viewing of the desiccant without removal of the filter cap and the periodic removal of the filter cap to check the condition of the desiccant results in increased contamination. Failure to check the desiccant at periodic intervals increases the likelihood that the desiccant will be contaminated and thus not effective.

A further problem with systems such as illustrated in the McCall patent is that the air passing into the dust filter may pass through the dust filter into the oil reservoir without passing through the desiccant. In this way, the value of the desiccant to the system may be materially reduced.

It is accordingly an object of the present invention to obviate these and other deficiencies of such known systems and to provide a novel hygroscopic breather cap for a petroleum tank such as an oil reservoir.

Another object of the present invention is to provide a novel hygroscopic breather cap in which dust is removed from the air prior to passage through the desiccant.

Yet another object of the present invention is to provide a novel hygroscopic breather cap for a liquid petroleum tank which the air entering the tank is forced to pass through a substantial volume of desiccant.

A further object of the present invention is to provide a novel hygroscopic breather cap which prevents the passage of desiccant fines into the petroleum tank.

Still a further object of the present invention is to provide a novel construction for a hygroscopic breather cap in which the condition of the desiccant may be readily observed without exposing the contents of the petroleum tank or the desiccant to the atmosphere.

Still a further object of the present invention is to provide a novel construction for a hygroscopic breather cap in which the effective air input openings may be easily increased in the field to adapt the breather cap for a particular application.

These and many other objects and advantages of the present invention will be readily apparent from the claims and from the following detailed description when read in conjunction with the appended drawings.

THE DRAWINGS

THE DETAILED DESCRIPTION

Figure 1:
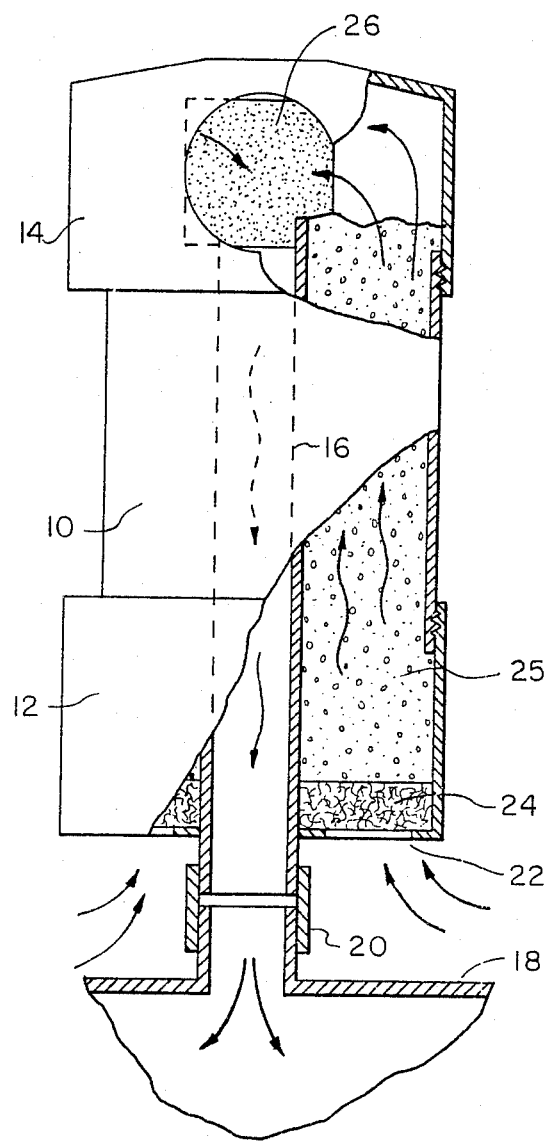
FIG. 1 is a pictorial view in elevation of one embodiment of the hygroscopic breather cap of the present invention in partial section illustrating the construction thereof.

With reference to FIG. 1, the breather cap of the present invention may be provided with a cylindrical body 10, a bottom end cap or closure plate 12 and a removable top 14. Disposed within the body 10 is a standpipe 16 which may be connected by a suitable conventional means to a petroleum tank 18 such as an oil reservoir of an industrial machine.

For example, the tank 18 may be provided with a conventional male fitting and the standpipe 16 of the present invention connected thereto by means of a relatively stiff rubber or plastic sleeve 20 with sufficient resiliency to receive the standpipe 16 and the fitting of the tank 18 in an air impervious and physically supported relationship. Alternatively, the breather cap of the present invention may be internally or externally threaded to mate with a conventional threaded fitting on the tank 18.

As illustrated in FIG. 1, the standpipe 16 passes through a central aperture in the bottom of the body to a position adjacent the closed upper end thereof. The lower end cap may be provided with a plurality of apertures 22 open to the atmosphere and the annulus between the standpipe 16 and the body 10 defines a radially outer passageway for air passing from the bottom of the breather cap to the closed upper end thereof.

With continued reference to FIG. 1, air entering the apertures 22 pass through a washer-shaped filter element 24 where dust particles may be removed. This filter element 24 may be of any suitable conventional type but is desirably comprised of a knitted polyester fabric with good releasing characteristics when agitated or subjected to a revenue air flow. Felt may also be used, but generally is less desirable because of the tendency of particles to embed.

The radially outer passageway may be filled along its length with any suitable conventional desiccant such as a silica gel, typically one in which the color changes, e.g. from blue to pink, as a function of the saturation of the desiccant with moisture. Desiccants may be mixed to combine the indicating characteristics with other characteristics.

With continued reference to FIG. 1, the upper end of the standpipe 16 may be provided with a foam element 26 which serves to increase the effective surface area of the open upper end of the standpipe 16. This material may be of any suitable conventional material such as a 30 to 45 PPI foam with or without charcoal and serves the additional purpose of preventing the passage of desiccant fines into the standpipe 16 and thus into the tank.

In operation, air passes upwardly through the radially outer apertures 22, through the dust filter 24, throgh the desiccant 25 along the vertical length of the breather cap, and through the foam material 26 into the top of the standpipe 16. In this way, the air is passed successively through a dust filter, a desiccant, and a desiccant fine filter before passage into the petroleum tank is permitted.

As illustrated in FIG. 1, a transparent window may be provided in the top 14 of the filter so that the condition of the desiccant adjacent the open end of the standpipe 16 may be observed without removal of the filter from its operational status. In this way, the condition of the filter furthest from the air inlet, and thus the last of the desiccant to be contaminated, may be readily observed and the breather cap removed only when necessary for recharging with desiccant.

Figure 2:
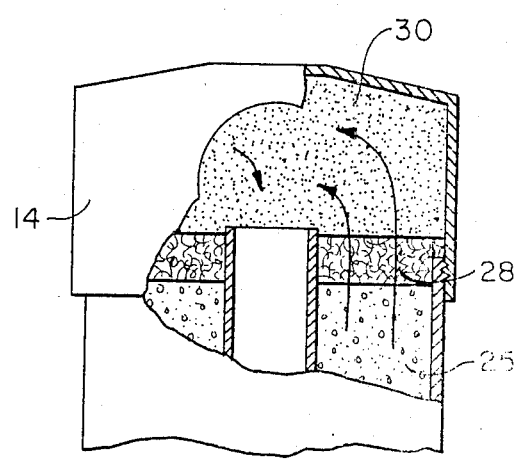
FIG. 2 is an alternative embodiment of the top portion of the breather cap of FIG. 1.
Figure 3:
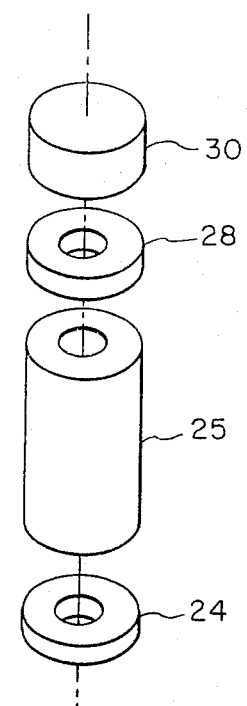
FIG. 3 is an exploded view of the breather cap illustrated in FIG. 2 illustrating the treatment of the air passing therethrough.

In the embodiment illustrated in FIG. 2, a second washer-shaped filter 28 may be provided atop the desiccant 25. It may be held securely in place by a foam member 30 which fills the cavity within the top 14. The functional operation of the filter constructed as illustrated in FIG. 2 may be seen in FIG. 3 where air passes through the first filter 24, through the desiccant 25, through the second filter 28 into the air pervious foam member 30 located in the top 14 of the breather cap. From there, the air passes downwardly into the open top of the standpipe 16 (not shown in FIG. 3) and into the petroleum tank.

Figure 4:
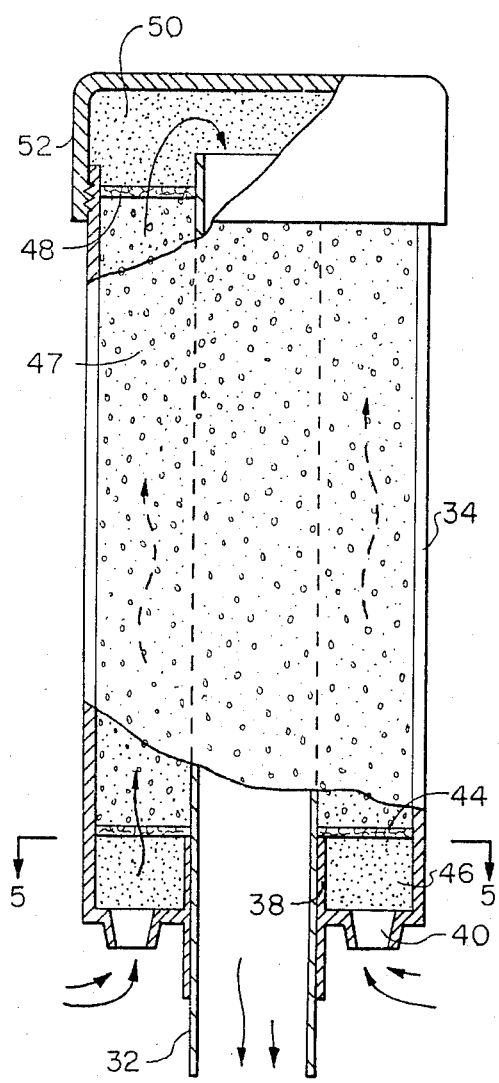
FIG. 4 is a pictorial view in elevation of a third embodiment of the hygroscopic filter cap of the present invention in partial section.
Figure 5:
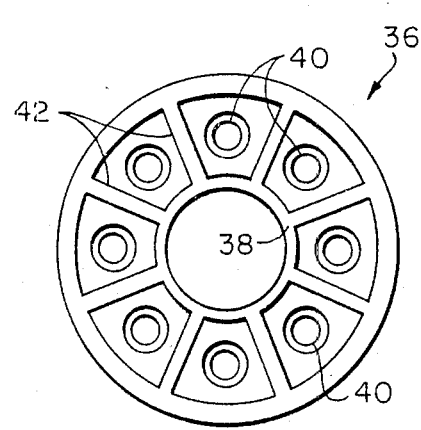
FIG. 5 is a section taken through lines 5—5 of FIG. 4.

An alternative embodiment is illustrated in FIGS. 4 and 5. With reference to FIG. 4, a standpipe 32 may be used to carry a generally cylindrical body 34 by virtue of an end or closure plate 36. As illustrated in FIGS. 4 and 5, the closure plate 36 may have a cylindrical sleeve portion 38 adapted to engage the standpipe 32 in an air impervious relationship.

As shown in FIG. 5, the central sleeve 38 may be connected to the side walls by means of a plurality of spaced ribs 42. These ribs 42, as well as the sleeve 38, may be used to support a first fabric filter 44. Additional support for the filter 44 may be provided by a first air impervious foam member 46.

As shown in FIG. 5, the central sleeve 38 may be connected to the side walls by means of a plurality of spaced ribs 42. These ribs 42, as well as the sleeve 38, may be used to support a first fabric filter 44. Additional support for the filter 44 may be provided by a first air impervious foam member 46.

The closure plate 36 may also be provided with a number of structurally weakened areas 40 around the periphery of the central sleeve 38 so that these areas may be readily removed in the field to selectively vary the effective air intake area of the breather cap. These areas may be of the "knock-out" type or alternative simply thin-walled so that one or more thin-walled areas may be easily removed in the field by a screwdriver or other readily available tool.

With continued reference to FIG. 4, a second washer-shaped fabric filter 48 may be placed atop the desiccant 47 and held in place by a second air pervious foam member 50 which fills the removable cap 52 of the breather cap.

As illustrated in FIG. 4, air entering the apertures 40 in the closure plate 36 at the bottom of the breather cap, successively passes through the first foam member 46, a first fabric filter 44, the desiccant 47, through the second fabric filter 48, and the second foam member 50 into the open top of the standpipe 32.

The entire body 34 of the breather cap may be made of a transparent material such as a clear plastic so that the condition of the desiccant 46 may be readily observed therethrough over the entire length of the filter cap.

ADVANTAGES AND SCOPE OF INVENTION

The present invention significantly reduces the problems of water contaminated oil, and rust inside the petroleum tank. In addition, it provides improved particulate filtration, improved oil oxidation stability and increases oil integrity. Abrasive wear of the industrial machines is reduced as is the attendant downtime and maintenance costs. Moreover, the condition of the unit is constantly available without taking the unit out of service.

The breather cap of the present invention provides for filtering of dust particles before the air reaches the desiccant and ensures a prolonged passage of the air through the desiccant. A second filter is provided to prevent the passage of desiccant fines into the petroleum tank.

The construction of the breather cap is simple, thus facilitating installation and varying of the effective air intake area in the field. The breather cap is easily recharged with desiccant by removal of the top.

These and many other modifications of the present invention will be readily apparent to one skilled in the art from the claims when read in conjunction with the foregoing specification. It should be understood that the foregoing description of preferred embodiments is illustrative only, and that many modifications may be made without departing from the spirit of the invention as defined in the claims when accorded a full range of equivalents.

What is claimed is:

1. A hygroscopic breather cap for a liquid petroleum tank comprising:
    an air impervious body closed at one end, having a standpipe aperture at the other end, and having a plurality of apertures open to the atmosphere adjacent said other end, said body having an air impervious standpipe communicating with said standpipe aperture at one end and being open at the other end at a point adjacent to but spaced from the closed end of said body to form an air impervious partition between a central passageway communicating with said standpipe aperture and a radially outer passageway communicating with said plurality of apertures, so that air entering said body through said plurality of apertures is forced by said standpipe to travel substantially the length of said body through said radially outer passageway into the open end of said standpipe, and then substantially the length of said body through said central passageway before exiting said central aperture;

a first fabric disposed within said radially outer passageway adjacent said plurality of apertures;

a second fabric disposed within said radially outer passageway adjacent the open end of said standpipe;

a volume of a granular desiccant substantially filling said radially outer passageway between said fabrics, said fabrics being of a type which will inhibit the passage of dust particles into said radially outer passageway and the passage of desiccant fines from said radially outer passageway into said central passageway; and an air pervious foam member disposed within said body adjacent the closed end thereof in position so that air passing from said radially outer passageway into said central passageway passes therethrough, whereby moist and dust-laden air entering said radially outer passageway passes through said first fabric where dust is removed, through said desiccant where moisture is removed, through said second fabric where desiccant fines are removed, and through said foam prior to entering the petroleum tank through said central passageway, to thereby reduce contamination of the liquid petroleum within the tank from dust and water and the attendant oxidation of the interior wall of the tank.

2. The breather cap of claim 1 wherein said body is provided with an air impervious window through which the condition of said desiccant may be visually observed.

3. The breather cap of claim 1 wherein said body is substantially transparent over substantially all of the portion thereof radially outside of said desiccant so that the condition of said desiccant may be visually observed.

4. A hygroscopic breather cap for a liquid petroleum tank comprising:

an air impervious cylindrical standpipe open at both ends to form a central passageway;

a first air pervious foam member disposed around said standpipe adjacent one end thereof;

a first washer-shaped fabric filter disposed around said standpipe adjacent said foam member;

a volume of granular desiccant disposed around said standpipe intermediate the ends thereof;

a second washer-shaped fabric filter disposed around said standpipe adjacent the other end thereof;

a second air pervious foam member disposed across the open end of said standpipe adjacent said second filter; and a body having an aperture adapted to receive said standpipe in a substantially air impervious relationship so that said body is carried by said standpipe, and having a plurality of apertures radially outward of said central aperture adjacent the standpipe receiving end thereof so that air passing through the breather cap is forced to pass successively through said first foam member, said first filter, said desiccant, said second filter, and said second foam member whereby moist and dust-laden air entering said radially outer passageway passes through said first fabric where dust is removed, through said desiccant where moisture is removed, through said second fabric where desiccant fines are removed, and through said foam prior to entering the petroleum tank through said central passageway, to thereby reduce contamination of the liquid petroleum within the tank from dust and water and the attendant oxidation of the interior wall of the tank.

5. The breather cap of claim 4 wherein said body is sufficiently transparent for the condition of said desiccant to be visually observed.

6. The breather cap of claim 4 wherein said body is provided with a plurality of areas of reduced structural strength to facilitate the manual puncturing thereof to form said plurality of apertures and to selectively increase the effective area of air entry into the filter cap.

7. The breather cap of claim 4 wherein the standpipe receiving end of said body includes a closure plate having spaced ribs for supporting said first filter in a spaced relationship therefrom, said closure plate being provided with a plurality of apertures and to selectively increase the effective area of air entry into the filter cap.

8. A hygroscopic breather cap for a liquid petroleum tank comprising:

an air impervious cylindrical standpipe open at both ends;

a cylindrical body closed at one end and having a closure plate at the other end, said closure plate having a central aperture adapted to receive said standpipe in a substantially air impervius relationship so that said body is carried by said standpipe with one end interiorly disposed adjacent to but spaced from the closed end of said body to form an elongated annulus between said standpipe and said body, said closure plate having a plurality of areas of reduced structural strength radially outward of said central aperture selectively apertured for the entrance of air and having means for supporting a first filter in a spaced relationship from said plurality of areas;

a first filter supported by said support means in said annulus;

a volume of granular desiccant supported by said first filter in said annulus, said body being sufficiently transparent for the condition of said desiccant to be visually observed;

a second filter supported by said desiccant in said annulus, said second filter including a woven fabric supported by said desiccant and an air impervious foam member disposed across the end of said standpipe adjacent the closed end of said body, whereby moist and dust laden air entering the apertures in said radially outer areas of reduced structural strength apertures passes through said first filter where dust is removed, through said desiccant where moisture is removed, through said second filter where desiccant fines are removed, all prior to entering the petroleum tank through said standpipe, to thereby reduce contamination of the liquid petroleum within the tank from dust and water and the attendant oxidation of the interior walls of the tank.

9. A hygroscopic breather cap for a liquid petroleum tank comprising:

an air impervious body closed at one end and having at the other end a central standpipe aperture adapted to communicate with the interior of the tank and a plurality of peripheral apertures open to the atmosphere, said body having an air impervious standpipe communicating with said central aperture and extending interiorly of said body to a point adjacent to but spaced from the closed end thereof to form an air impervious partition along the length thereof between a central passageway communicating with said central aperture and a radially outer passageway communicating with said plurality of peripheral apertures, the cross-sectional area of said radially outer passageway being large relative to the cross-sectional area of said central passageway, so that air entering said body through said plurality of peripheral apertures is forced by said standpipe to travel substantially the length of said body through said radially outer passageway into the open end of said standpipe, and then substantially the length of said body through said central passageway before exiting said central aperture;

first and second fabrics disposed within said radially outer passageway adjacent opposite ends thereof;

a volume of desiccant substantially filling said radially outer passageway between said fabrics, said fabrics being of a type which will inhibit the passage of dust particles into said radially outer passageway and the passage of desiccant fines from said radially outer passageway into said central passageway; and an air pervious foam member disposed within said body adjacent the closed end thereof across the end of said standpipe so that air passing from said radially outer passageway into said central passageway passes therethrough, whereby moist and dust-laden air entering said radially outer passageway passes through said first fabric where dust is removed, through said desiccant where moisture is removed, through said second fabric where desiccant fines are removed, and through said foam member prior to entering the petroleum tank through said central passageway, to thereby reduce contamination of the liquid petroleum within the tank from dust and water and the attendant oxidation of the interior walk of the tank.

10. The breather cap of claim 9 wherein at least a portion of said body is sufficiently transparent so that the condition of said desiccant may be visually observed.

* * * * *